March 10, 1953     C. W. HANSEN     2,630,664
FIELD FORAGE HARVESTER

Filed Dec. 28, 1946     4 Sheets-Sheet 1

Inventor:
Charles W. Hansen.
By Soans, Pond & Anderson
Att'ys.

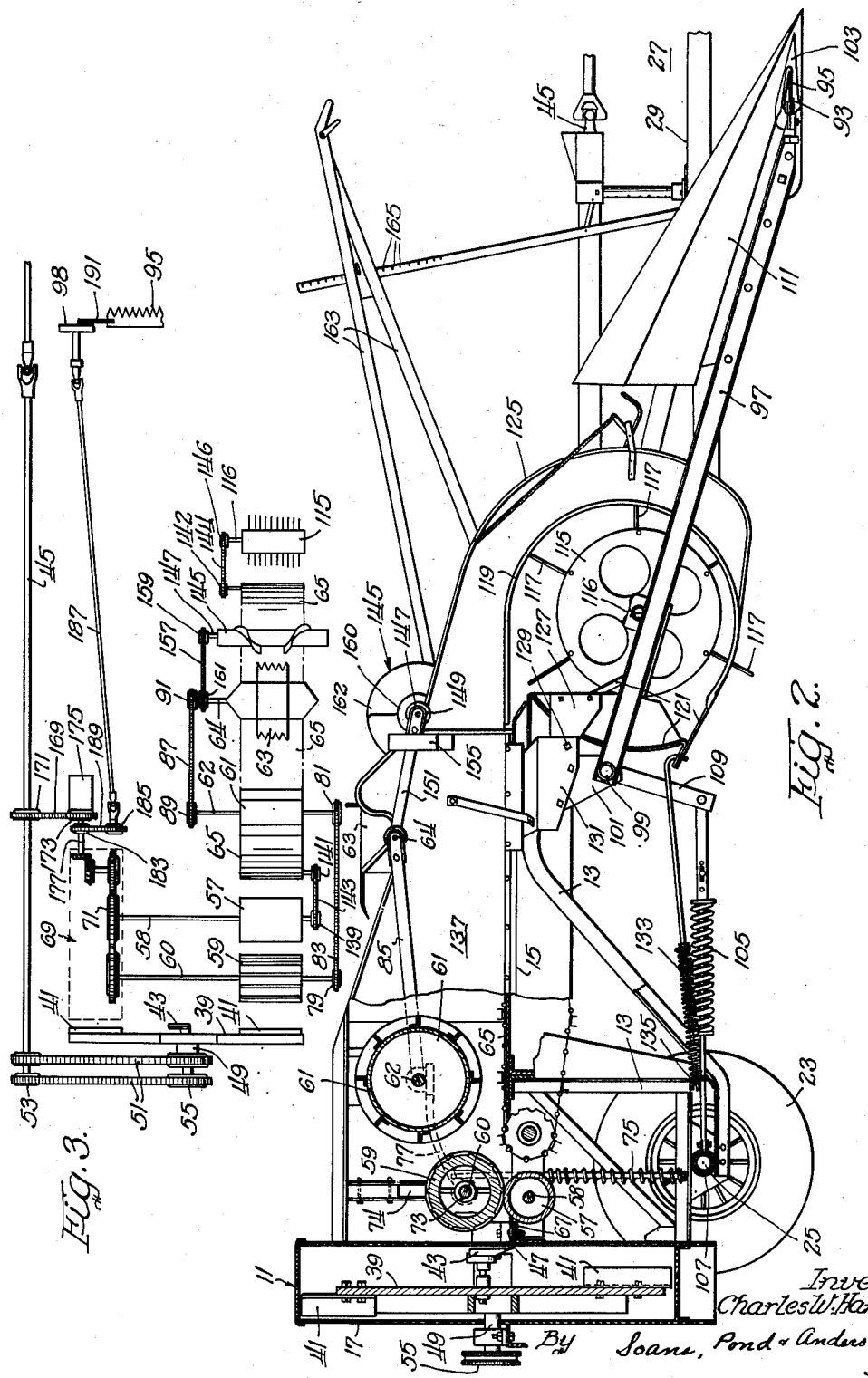

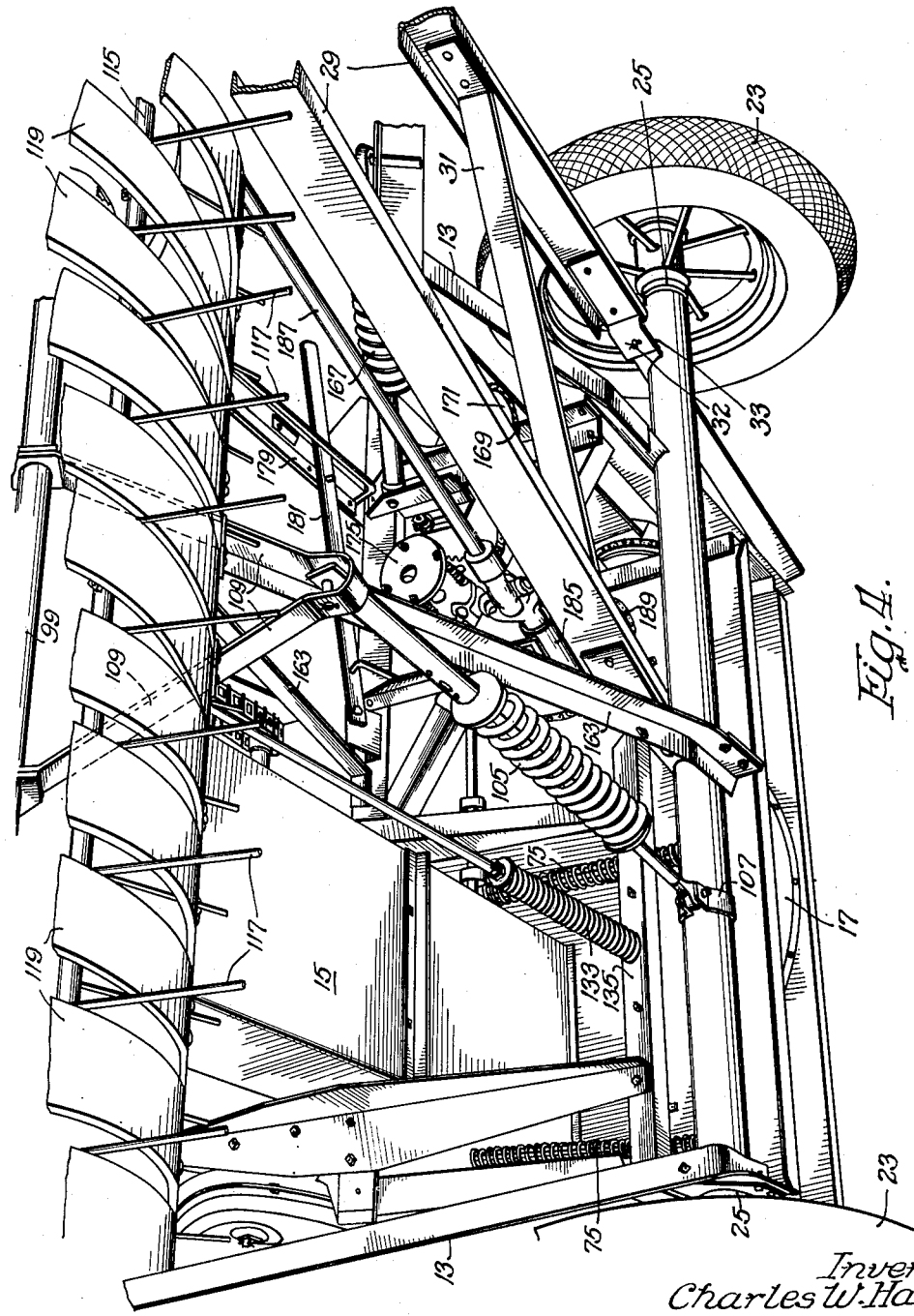

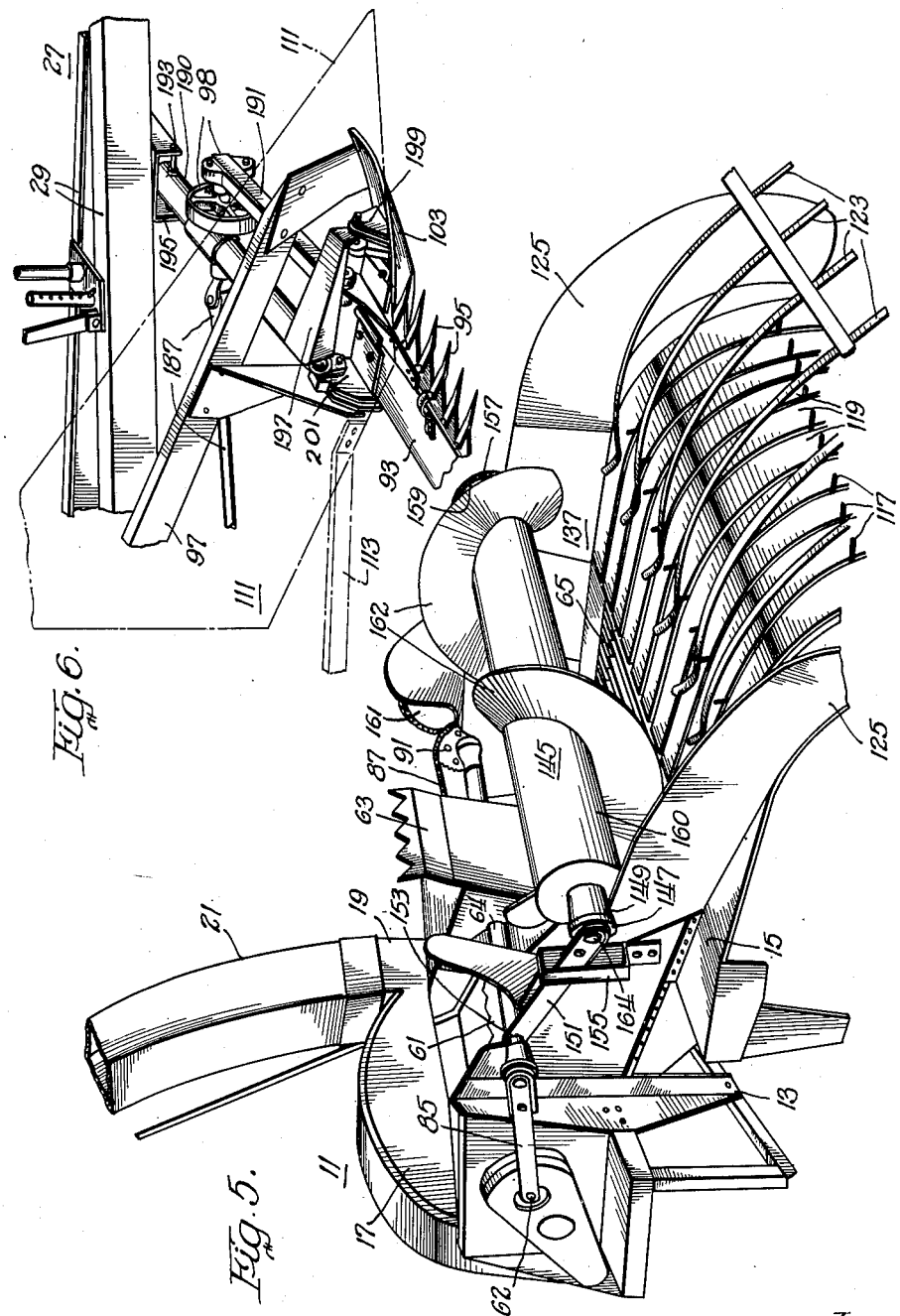

Patented Mar. 10, 1953

2,630,664

UNITED STATES PATENT OFFICE 2,630,664

FIELD FORAGE HARVESTER

Charles W. Hansen, Racine, Wis., assignor to J. I. Case Company, Racine, Wis., a corporation of Wisconsin Application December 28, 1946, Serial No. 718,997

4 Claims. (Cl. 56—23)

The present invention relates to field forage harvesters and, in particular, to field forage harvesters adapted to process standing forage crops.

Field forage harvesters have been one of the later developments in the farm equipment field. Prior to the development of the field forage harvester, two general methods were used in the harvesting of forage crops. One involved the cutting of the crop, its placing in windrows, and the subsequent collecting of the crop, followed by its transport to a silo or other storage point where it was cut in suitable lengths. The other method, used for fodder corn, sorghum, and the like was generally similar except that the harvested crop was conveyed to the feed cutter or other processing equipment immediately after it was cut.

The field forage harvester, in contrast with these older procedures with their multitude of time-consuming, laborious, transfer and handling operations, was designed to effect the harvesting and processing of the crop in the field. The field forage harvester delivers, in one operation, a processed crop cut in suitable lengths for immediate delivery to a silo or other storage point. Forage harvesters have been developed which will harvest a standing row crop, such as corn and sorghum, and a windrowed crop such as hay, clover and alfalfa, but the known equipment is not suitable for the single step processing of standing crops of the hay, clover and alfalfa type.

The object of the present invention, therefore, is to provide an improved field forage harvester that will effect the single step processing of standing crops of this type. As will hereinafter appear, this object is accomplished by the provision of a field forage harvester which is operable to mow a standing field crop, to pick it up, to convey the crop to a cutting device, to cut the crop into short lengths for feed, and then to convey the cut crop into a suitable transport vehicle. A further object of the invention is to provide an easily attachable mowing apparatus for field forage harvesters. The apparatus of the invention includes novel structural combinations and improvements, the features of which will be made apparent in the accompanying drawings and the following description:

In the drawings:

Fig. 2 is a side elevational view, partially in section, of the field forage harvester shown in Fig. 1;

Fig. 3 is a diagrammatic plan view of the drive mechanism of the harvester;

Fig. 4 is a fragmentary, perspective view on an enlarged scale of the supporting structure of the harvester;

Fig. 5 is a fragmentary, perspective view on an enlarged scale of the harvester conveyor mechanism; and Fig. 6 is a fragmentary, perspective view on an enlarged scale of the supporting structure at the drive end of the mower unit, constituting a part of the harvester structure.

Figure 1:
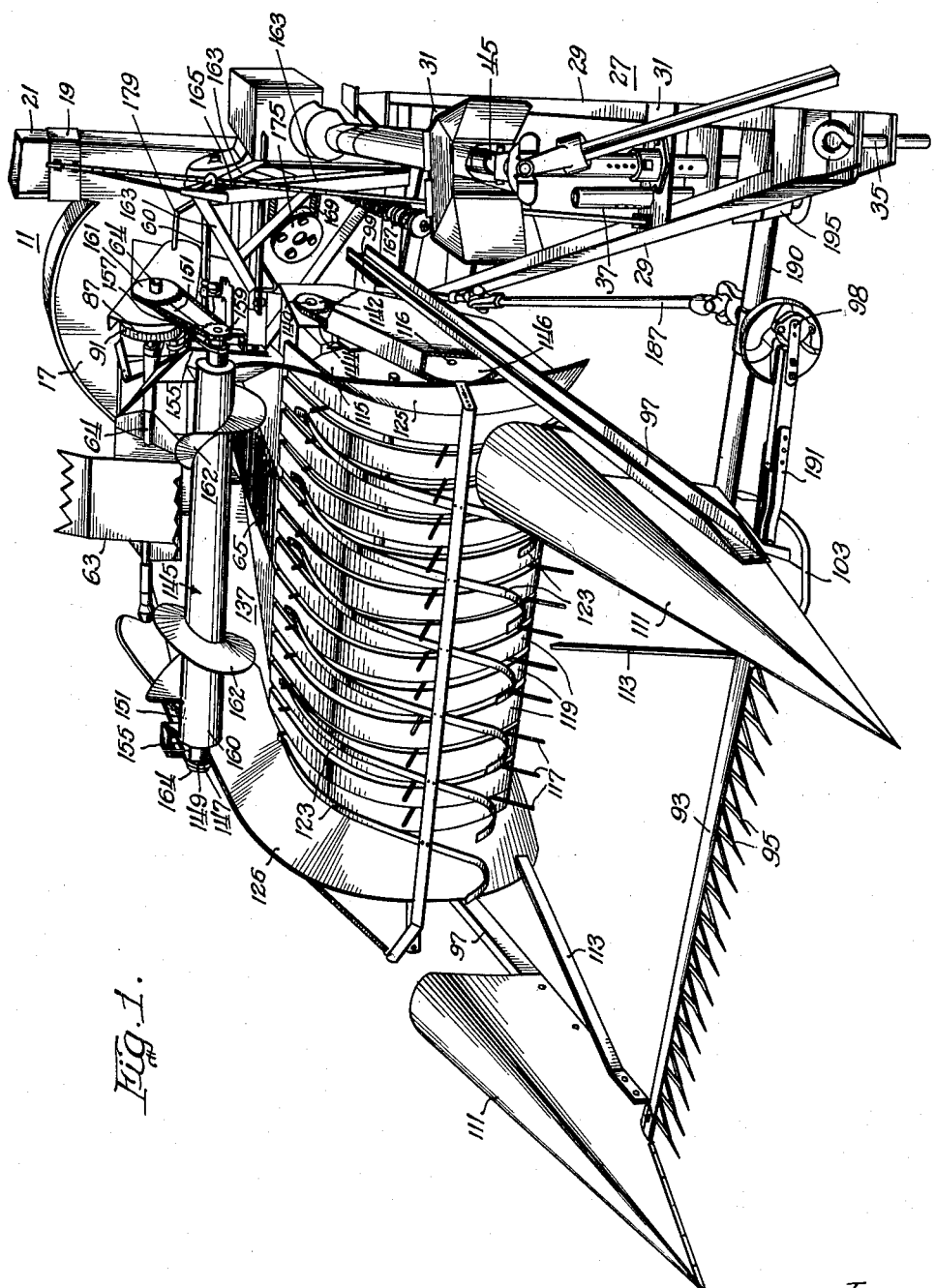
Fig. 1 is a fragmentary, perspective view of a field forage harvester in accordance with the present invention.

As previously stated, the forage crop harvester of the present invention is intended for use in the harvesting of standing field crops and is operable to mow the crop, to pick up the mowed crop, and to convey the crop so collected to the crop cutting and delivery unit, where it is cut into suitable short lengths for the making of silage and is subsequently delivered through a blower outlet to a wagon or other conveyance by which the material is hauled to a silo, silage trench, or other disposition point.

A crop cutting and delivery unit 11 supports the complete harvester and includes a main frame 13 which is fabricated from suitable structural members, which define a generally horizontal platform portion 15 and a housing 17 for containing a rotatable cutter and blower assembly. At one side of the blower housing 17, there is provided an outlet conduit 19 for the cut crop material and an outlet or delivery pipe 21 is arranged to fit over the open upper end of the conduit 19.

Suitable support wheels 23 are journalled on an axle 25 which is affixed to the main frame 13 in order that the harvester may be moved during use. A fabricated draw bar 27, which includes a pair of channel side sections 29 and suitable cross members 31, is hingedly connected to the axle 25 by means of suitable transversely extending, horizontally disposed hinge pins 32 which engage gusset plates 33 welded to the axle 25. The illustrated embodiment of the invention is a pull type implement, and it is intended to be drawn by, and powered from, a tractor. It will be understood that many of the features of the invention are applicable to tractor-supported or self-powered implements.

The forward end of the draw bar 27 is adapted to be connected to the tractor draw bar by means of a suitable hitch pin 35. The draw bar 27 is provided with an adjustable stand 37, in order that it may be supported at the proper elevation when the harvester is being hitched to the tractor. The stand 37 is, of course, raised during the operation of the machine.

The cutter and blower wheel 39, constituting a part of the crop cutting and delivery unit 11, is fabricated from a piece of boiler plate, to which is attached blower vanes 41 and cutter knives 43. The cutter and blower wheel 39 is of substantially the same construction as the cutter and blower wheel disclosed in U. S. Patent No. 2,385,451, to Norman R. Krause and Charles W. Hansen. The cutter and blower wheel 39 is rotatably mounted in suitable bearings and is adapted to be driven by means of a direct connection to the harvester power take-off shaft 45 which connects with the power take-off shaft on the tractor. A shear plate 47 is supported upon the main frame 13 adjacent the path of the knives 43 and co-operates with them to effect the cutting of the crop. The cutter and blower wheel shaft 49 is connected with the power take-off shaft 45 by means of a pair of chains 51 and suitable sprockets 53 and 55.

The crop material is fed to the shear plate 47 by means of a pair of co-operating squeeze type feed rolls 57 and 59, a delivery roll 61, a beater roll 63, and a slat type chain conveyor or feed rake 65. The lower feed roll 57 is a smooth-surfaced, cylindrical roll, rotatably supported upon a shaft 58, journalled in suitable bearings (not shown). A scraper plate 67 cleans the surface of the roll 57 during operation of the machine. The lower feed roll 57 is driven from a gear box mechanism indicated at 69 in Fig. 3, by means of a gear 71 which is keyed to the roll shaft 58 and which meshes with one of the output gears of the gear box 69.

The upper feed roll 59 is desirably of fluted construction, and is supported upon a suitable shaft 60 as illustrated in the drawings. This roll 59 must move away from the co-operating lower feed roll 57, in order to permit passage of the crop material between the feed rolls and, accordingly, the roll shaft 60 is supported by bearings 73 which are slidable vertically in suitable guide slots 74 and which are biased by the action of a pair of spring and rod assemblies 75. This construction is substantially similar to the construction shown in Krause and Hansen Patent No. 2,385,451. The upper feed roll shaft 60 is driven from the main gear box 69 by another of the output gears.

The delivery roll 61 is preferably of the vane type, as illustrated in the drawings, and is substantially the same as the delivery roll illustrated in Krause and Hansen Patent No. 2,385,451. The roll 61 is supported on a shaft 62, so as to be moveable toward and away from the conveyor rake in a fixed relation to the upper feed roll 59, by means of a pair of link members 77 which are biased by the pair of spring and rod assemblies 75. Sprockets 79 and 81 and a drive chain 83 connect the delivery roll 61 with the upper feed roll 59 to provide a source of power for rotatable movement. The beater roll 63 in the structure illustrated in the drawings is of the four wing type substantially as shown in Patent No. 2,385,451 and is supported for rotation about its own axis, and for movement relative to the inter-connected delivery 61 and feed rolls 59 by means of a shaft 64 and a pair of bearing link members 85, each of which is journalled at one end to one end of the shaft 62 for the delivery roll 61. The beater roll 63 is driven by means of a drive chain 87, which engages a sprocket 89 on the end of the delivery roll supporting shaft 62 and a sprocket 91 on the end of the beater roll shaft 64.

The standing field crop material which is to be processed is mowed by a cutter bar 93 which includes the usual reciprocating sickle 95 driven by a conventional pitman drive 96. The cutter bar 93 is supported at each end by a forwardly extending, channel-shaped structural member 97. At their inner ends, the channel members 97 are integrally joined by a shaft 99 which is journalled in suitable bearings forming a part of gusset plates 101 attached at each side of the main frame 13 of the cutting and delivery unit 11; thus, the cutter bar 93 is pivotally mounted about an axis normal to the direction of travel of the apparatus. The cutter bar 93 is designed to move in close proximity with the level of the field in order to insure close cutting of the standing crop. For this purpose, a shoe guide 103 adapted to slide along the ground, is provided at each end of the cutter bar 93 to maintain the bar in proper relation with the ground level.

The cutter bar 93 and the supporting channel members 97 are counter-balanced by means of a spring and rod assembly 105 which extends from a bracket 107 on the main axle 25 to a downwardly extending lever arm or yoke member 109 which is rigidly attached to the cutter bar pivoting shaft 99. The spring tension is adjusted so that the cutter bar 93 is maintained in a substantially fixed relation with the main frame 13, but is resilient enough to move upward if the cutter bar 93 strikes an object in the field. Large divider points 111 and strap type crop deflectors 113 are attached at the outer or forward ends of the channel-shaped bar supporting members 97 to insure that the cut crop falls in a position from which it may be picked up by the pick-up unit.

The pick-up or collecting unit may be any of the known general types. The windrow pick-up shown and described in Russell Patent 2,362,861, for example, is particularly suitable in the subject apparatus, and a pick-up of this type is illustrated in the drawings. The mechanism includes a rotatable inner cylinder 115 supported on a shaft 116, and is adapted to be powered from the conveyor 65, as will be hereinafter described. The cylinder 115 supports a plurality of pick-up tines 117, arranged in rows and adapted to project between spaced-apart stripper plates 119 which are supported upon the frame 121 of the pick-up and which define a generally cylindrical surface. Resilient hold-down strips 123 are provided, for holding the picked-up crop material in contact with the stripper plates 119, and suitably flared, end sections 125 further guide and direct the crop material which is picked up by the tines 117.

The various elements of the windrow pick-up are supported upon a suitable frame structure 121, which is not shown in detail. However, the frame includes, at either end thereof, a plate member 127 which supports a horizontally extending hinge pin 129. The hinge pins 129 are adapted to fit within openings provided in two plate members 131 which are integrally attached to the main frame 13 of the cutter and delivery unit in order that the pick-up may be hingedly connected to that structure. The pick-up is counter-balanced by means of a spring 133, one end of which is supported upon the crosswise frame element 135 and the other end of which is adapted to engage the pick-up frame 121 through a connection which permits relative movement therebetween. Thus the pick-up unit is free to move independently of the cutter bar 93, or stated differently, the cutter bar 93 is free to float vertically without influencing the position of the pick-up unit.

The crop material which is collected by the pick-up normally used with the above described moving mechanism, is guided along an endless, belt-type conveyor such as a slat conveyor or feed rake 65 and into the cutter and blower mechanism 11 by means of a suitably shaped hopper or guideway 137. It will be understood that chain rakes or equivalent means can be substituted for the endless, belt type conveyor 65, and the term "endless conveyor," as used herein, is intended to include all such means. The conveyor 65 is driven from a sprocket 139, which is keyed to the supporting shaft 58 for the lower squeeze type feed roll 57 by means of a chain 143 and a sprocket 141 keyed to the supporting shaft for the inner end of the conveyor. The conveyor 65 and the feed rolls 57 and 59 move at substantially equal linear speeds which bear a predetermined relation to the operational speeds of the other elements of the apparatus so as to effect even feeding of the crop material. The outer, supporting shaft 140 of the conveyor is provided with a sprocket 142 adapted to be operatively connected by means of a drive chain 144 with a sprocket 146 on the crop pick-up shaft 116.

In order to increase the efficiency of the conveyor and feed cutter units a centering auger 145 is provided forward of the beater roll 63 to form the crop material into a ridge which can be more conveniently fed to the cutter unit. The centering auger 145 comprises a feed auger having transversely extending, horizontally disposed, opposed flights, as shown in the drawings. The use of a centering auger 145 permits the use of a relatively narrow conveyor 65 even though material is fed across the entire width of the wide portion of the hopper 137. The auger 145 is attached to a shaft 147 which is journalled in suitable bearings 149 provided at one end of link members 151, whose other ends are attached to bearings 153 which engage the beater roll shaft 64. The link members 151, which provide the centering auger bearings, are vertically movable in guideways 155, enabling the centering auger to move a limited amount in a vertical direction in response to variations in the amount of crop fed to the conveyor. The centering auger 145 is driven by a chain drive 157 connecting a drive sprocket 159 on one end of the auger shaft 147 to a sprocket 161 on one end of the beater roll shaft 64. The feed auger 145 is preferably of the type having a relatively large diameter central portion 160 around which the flights 162 are disposed. The pitch of the flights 162 is such that the crop material is effectively moved to the central portion of the hopper 137 during the short interval of time in which the crop is engaged by the auger. The auger 145 is thus of the rapid feeding type. The bearing members 149 are held in place on the auger shaft by suitable retainers 164.

During the operation of the harvester it is frequently necessary to adjust the height of the pick-up or other crop collecting means relative to the ground, and since the conditions requiring such adjustment may change from time to time, it is important that the apparatus include means whereby the relative height of the pick-up and the mower can be adjusted prior to starting up and during the actual running of the harvester in the field. In the illustrated embodiments of the invention this relative adjustment is made possible by virtue of the fact that the draw bar 27 is hingedly connected to the frame 13 of the cutter and delivery unit 11, which frame supports the pick-up and mower. Thus, by providing an adjustable connection between the draw bar 27 and the frame 13 it is an easy matter to adjust the height of the crop collecting and mowing means. This connection in the illustrated structure includes a forwardly extending adjusting lever 163 rigidly affixed to the blower and cutter frame 13, and adapted to be held in various positions relative to that frame by means of a notched link and a spring latch connection 165.

The adjusting lever 163 constitutes a tripod which is fabricated of three, suitably braced angle sections. The upper angle sections are affixed to the platform portion 15 of the cutter and delivery unit frame. The lower angle section is affixed to one of the structural elements in the lower part of the frame 13. It will be apparent that movement of the tripod adjusting lever 163 up and down, relative to the draw bar 27 will rotate the counter-balanced mower unit, the counter-balanced pick-up unit, the conveyor unit, and the crop cutting and delivery unit about the main axle 25, thereby altering the position of the mowing and collecting means relative to the ground level. In order that this adjustment may be made from the tractor unit without requiring the operator to stop the machine and dismount, the forward end of the adjustment lever 163 is carried to a point just above the end of the draw bar 27, and the weight, or a large portion of the weight, of the mechanism carried on the main frame 13 of the cutter and blower unit 11 is counter-balanced by a suitable compression spring 167.

Power is supplied to the gear box 69, which constitutes the main drive means for all of the driven moving parts of the harvester except the cutter and blower wheel 39, and which may be of the same construction as the gear box and clutch unit illustrated in United States Patent 2,385,451, by means of a drive chain 169 which engages a sprocket 171 keyed to the power take-off shaft 45 and a sprocket 173 keyed to one side of a jump clutch 175. The other side of the jump clutch 175 is keyed to a shaft 177 which serves as the power input shaft to the gear box 69. The jump clutch 175 provides a convenient indicator for determining when the harvester is operating at full capacity, and in the event of a stoppage of the crop collecting and feeding mechanism for any reason, it prevents breakage or damage to the parts concerned.

Sometimes during the operation of the harvester the mechanism may clog, due to rapid feeding of the crop material, and in such instances it is usually necessary to stop the crop feeding mechanism. Desirably, this control should be accessible to the operator riding the tractor which powers the harvester, and this control is accomplished by means of an operating rod which is supported on the tripod, height adjusting lever 163 for slidable movement longitudinally thereof. The forward end of the control rod is bent over at right angles as shown at 179 in order that it may be conveniently gripped by the operator, and the inner end of the rod 179 engages a pivoted operating link 181, which is operable to disengage the clutch and stop the feeding of the crop material.

The gear box 69, in accordance with conventional practice, includes a reversing clutch mechanism which may be brought into operation by moving the control lever 179 to the reversing position, this movement being transmitted to the gear box mechanism through the operating link 181. The reversing feature of the gear box is used when the harvester feeding mechanism becomes completely clogged.

As shown particularly in Fig. 3, the reciprocating sickle 95 member of the mower is driven from a sprocket 183 attached to the shaft 177 intermediate the jump clutch 175 and the gear box 69. The sprocket 183 is operatively connected to a rotatably supported sprocket 185 which is attached to the mower drive shaft 187 by means of a drive chain 189. The mower drive shaft 187 extends forwardly to a conventional pitman drive 98 supported on a cross member 190 hingedly connected at one end to the draw bar 27 and at its other end to the cutter bar 93. A pitman 191 operatively connects the pitman drive 98 and the reciprocating sickle bar 95.

As is shown in detail in Fig. 6, the cross member 190 supporting the pitman drive 98 is hingedly connected to a pin 193 pivotally supported by a bracket 195 attached to the channel shaped draw bar members 29. The other end of the cross member 190 is attached to a yoke member 197 which has its two arms pivotally connected to the forward and rear sections of the stationary cutter bar 93 as is shown at 199 and 201. The cross member 190 is made slightly longer than the length necessary to span the distance from the pin 193 on the draw bar 27 to the yoke member 197 on the cutter bar 93. Thus, the draw bar 27 may be moved vertically, relative to the cutter bar 93, without changing the position of the cutter bar 93 in the field.

The field forage harvester of the present invention will process a standing crop such as hay, alfalfa, clover, beans, and the like, to cut silage in one operation, enabling large time savings in handling such crops. The mower unit may be utilized substantially without change as an attachment for other field forage harvesters than the one described in this application.

The features of my invention that are believed to be new are expressly set forth in the appended claims.

I claim:

1. The combination of a wheel supported main frame having a drawbar pivotally connected thereto, said drawbar extending forwardly for connection to an associated tractor, a crop pick-up unit supported on said frame, an adjusting means interconnecting said drawbar and said main frame for adjusting said main frame relative to said drawbar whereby the position of said pick-up unit relative to the ground is adjusted, means for mowing a standing crop which includes a transverse, horizontally disposed cutter bar located forwardly of said crop pick-up unit, said cutter bar being mechanically connected to said main frame by means of a pair of spaced apart, forwardly extending support members, a transversely extending, horizontally disposed member extending between and being rigidly attached to each of said support members, said horizontally disposed member having an eccentric extension and forming a rotatable support on said main frame whereby said cutter bar is vertically movable about the axis defined by said horizontally disposed member, resilient means including a compression spring extending between said eccentric extension of said horizontally disposed member and the main frame for counter-balancing at least a portion of the weight of said cutter bar and said support members, and said cutter bar and said drawbar being mechanically interconnected by a cross member which is pivotally connected to said drawbar and to said cutter bar whereby adjustment of the position of said pick-up unit relative to the ground simultaneously effects vertical adjustment of said cutter bar while maintaining it in a horizontally disposed position.

2. The combination of a wheel supported main frame having a drawbar pivotally connected thereto, said drawbar extending forwardly for connection to an associated tractor, a crop pick-up unit supported on said frame, an adjusting means interconnecting said drawbar and said main frame for adjusting said main frame relative to said drawbar whereby the position of said pick-up unit relative to the ground is adjusted, means for mowing a standing crop which includes a transverse, horizontally disposed cutter bar located forwardly of said crop pick-up unit, said cutter bar being mechanically connected to said main frame by means of a pair of spaced apart, forwardly extending support members, a transversely extending, horizontally disposed member extending between and being rigidly attached to each of said support members, said horizontally disposed member having a lateral extension and forming a rotatable support on said main frame whereby said cutter bar is vertically movable about the axis defined by said horizontally disposed member, counter-balancing means connected to said lateral extension of said horizontally disposed member for counter-balancing at least a portion of the weight of said cutter bar and said support members, and said cutter bar and said drawbar being mechanically interconnected by a cross member which is pivotally connected to said drawbar and to said cutter bar whereby adjustment of the position of said pick-up unit relative to the ground simultaneously effects vertical adjustment of said cutter bar while maintaining it in a horizontally disposed position.

3. The combination of a wheel supported main frame having a drawbar pivotally connected thereto, said drawbar extending forwardly for connection to an associated tractor, a crop pick-up unit supported on said frame, an adjusting means interconnecting said drawbar and said main frame for adjusting said main frame relative to said drawbar whereby the position of said pick-up unit relative to the ground is adjusted, means for mowing a standing crop which includes a transverse, horizontally disposed cutter bar located forwardly of said crop pick-up unit, said cutter bar being mechanically connected to said main frame by means of a pair of spaced apart, forwardly extending support members, a transversely extending, horizontally disposed member extending between and being rigidly attached to each of said support members, said horizontally disposed member having an eccentric extension and forming a rotatable support on said main frame whereby said cutter bar is vertically movable about the axis defined by said horizontally disposed member, said eccentric extension being below said support members, resilient means including a compression spring extending between said eccentric extension of said horizontally disposed member and the main frame for counterbalancing at least a portion of the weight of said cutter bar and said support members, and said cutter bar and said drawbar being mechanically interconnected by a cross member which is pivotally connected to said drawbar and to said cutter bar whereby adjustment of the position of said pick-up unit relative to the ground simultaneously effects vertical adjustment of said cutter bar while maintaining it in a horizontally disposed position.

4. The combination of a wheel supported main frame having a drawbar pivotally connected thereto, said drawbar extending forwardly for connection to an associated tractor, a crop cutting and delivery unit supported on said main frame, a crop pick-up unit supported on said frame forwardly of said crop cutting and delivery unit, an adjusting means interconnecting said drawbar and said main frame for adjusting said crop cutting and delivery unit relative to said drawbar whereby the position of said pick-up unit relative to the ground is adjusted, means for mowing a standing crop which includes a transverse, horizontally disposed cutter bar located forwardly of said crop pick-up unit, said cutter bar having a reciprocating sickle bar, said cutter bar being mechanically connected to said main frame by means of a pair of spaced apart, forwardly extending, support members, a transversely extending, horizontally disposed member extending between and being rigidly attached to each of said support members, said horizontally disposed member having an eccentric extension and forming a rotatable support on said main frame whereby said cutter bar is vertically movable about the axis defined by said horizontally disposed member, said eccentric extension being below said support members, resilient means including a compression spring extending between said eccentric extension of said horizontally disposed member and the main frame for counterbalancing at least a portion of the weight of said cutter bar and said support members, said cutter bar and said drawbar being mechanically interconnected by a cross member which is pivotally connected to said drawbar and to said cutter bar whereby adjustment of the position of said pick-up unit relative to the ground simultaneously effects vertical adjustment of said cutter bar while maintaining it in a horizontally disposed position, and said reciprocating sickle bar being powered by a pitman drive supported on said pivoted interconnecting member intermediate said drawbar and said cutter bar.

CHARLES W. HANSEN.

REFERENCES CITED

The following references are of record in the file of this patent:

UNITED STATES PATENTS

| Number | Name | Date |
|---|---|---|
| 536,132 | Crossman et al. | Mar. 19, 1895 |
| 1,111,757 | Nilson | Sept. 29, 1914 |
| 1,514,982 | Meyers | Nov. 11, 1924 |
| 1,859,586 | Gottschall et al. | May 24, 1932 |
| 2,270,471 | Pilcher et al. | Jan. 20, 1942 |
| 2,315,091 | Fees | Mar. 30, 1943 |
| 2,342,282 | Hill | Feb. 22, 1944 |
| 2,347,907 | Hill | May 2, 1944 |
| 2,378,107 | Russell | June 12, 1945 |
| 2,388,147 | Heth | Oct. 30, 1945 |
| 2,394,996 | Hill et al. | Feb. 19, 1946 |
| 2,427,876 | Pool et al. | Sept. 23, 1947 |
| 2,477,389 | Oehler et al. | July 26, 1949 |